United States Patent
Shadwell et al.

(10) Patent No.: US 12,152,391 B2
(45) Date of Patent: Nov. 26, 2024

(54) ROOF MOUNT ASSEMBLY WITH STABILIZED FASTENER MATRIX

(71) Applicant: OMG, Inc., Agawam, MA (US)

(72) Inventors: Peter J. Shadwell, Longmeadow, MA (US); Richard L Belinda, Westfield, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 18/179,658

(22) Filed: Mar. 7, 2023

(65) Prior Publication Data

US 2023/0203817 A1 Jun. 29, 2023

Related U.S. Application Data

(63) Continuation of application No. 16/779,933, filed on Feb. 3, 2020, now Pat. No. 11,598,098.

(60) Provisional application No. 62/804,994, filed on Feb. 13, 2019, provisional application No. 62/800,780, filed on Feb. 4, 2019.

(51) Int. Cl.
*E04D 13/00* (2006.01)
*F16M 13/02* (2006.01)

(52) U.S. Cl.
CPC ............. *E04D 13/00* (2013.01); *F16M 13/02* (2013.01)

(58) Field of Classification Search
CPC ..... Y10T 16/557; Y10T 16/5373; E05D 5/10; E05B 2005/102; E04D 13/00; F16M 13/02
USPC ........................................ 248/237; 52/24–26
See application file for complete search history.

(56) References Cited

U.S. PATENT DOCUMENTS

| | | | |
|---|---|---|---|
| 8,683,751 B2 | 4/2014 | Stearns | |
| 8,733,718 B2 | 5/2014 | Corsi | |
| 8,782,983 B2 | 7/2014 | Stearns | |
| 9,103,112 B2 | 8/2015 | Corsi | |
| 9,212,833 B2 | 12/2015 | Stearns et al. | |
| 9,698,723 B2 | 7/2017 | Liptak | |
| 2002/0066235 A1 | 6/2002 | Stearns et al. | |
| 2008/0006327 A1 | 1/2008 | Ball | |
| 2008/0099643 A1 | 5/2008 | Lin | |
| 2009/0047495 A1* | 2/2009 | Hubbs | B32B 5/18 521/54 |

(Continued)

FOREIGN PATENT DOCUMENTS

| | | |
|---|---|---|
| DE | 102005012054 B4 | 5/2010 |
| EP | 2088386 A2 | 2/2009 |
| JP | 2014066014 A | 4/2014 |

OTHER PUBLICATIONS

Supplemental European Search Report mailed Sep. 30, 2022 for European Patent Application No. 20752421.6.

*Primary Examiner* — Kimberly T Wood
(74) *Attorney, Agent, or Firm* — Alix, Yale & Ristas, LLP

(57) ABSTRACT

A roof mount assembly includes a bottom plate securable to a roofing structure and a top plate mounted on top of the bottom plate. The bottom plate includes a first compressible sealing pad affixed to a bottom surface and compressed between bottom plate and roofing surface. The top plate includes a second compressible sealing pad affixed to its bottom surface that is compressed when the top plate is secured mounted over the bottom plate via fasteners extending through holes in the top plate and threaded into bores in the bottom plate. The top plate may include a central crown and a connector projecting upward therefrom to secure an object over the roofing structure.

19 Claims, 15 Drawing Sheets

(56) References Cited

U.S. PATENT DOCUMENTS

| | | |
|---|---|---|
| 2011/0177708 A1 | 7/2011 | Smith |
| 2012/0233958 A1 | 9/2012 | Stearns |
| 2013/0074441 A1 | 3/2013 | Stearns |
| 2013/0298494 A1 | 11/2013 | Corsi |
| 2014/0331594 A1 | 11/2014 | Stearns et al. |
| 2016/0248369 A1 | 8/2016 | Almy |
| 2018/0010330 A1* | 1/2018 | Hamilton .............. E04B 1/6803 |
| 2018/0274238 A1 | 9/2018 | Aliabadi et al. |
| 2018/0313080 A1* | 11/2018 | Schmetzer .............. B32B 37/24 |
| 2020/0173604 A1 | 6/2020 | Corsi |

* cited by examiner

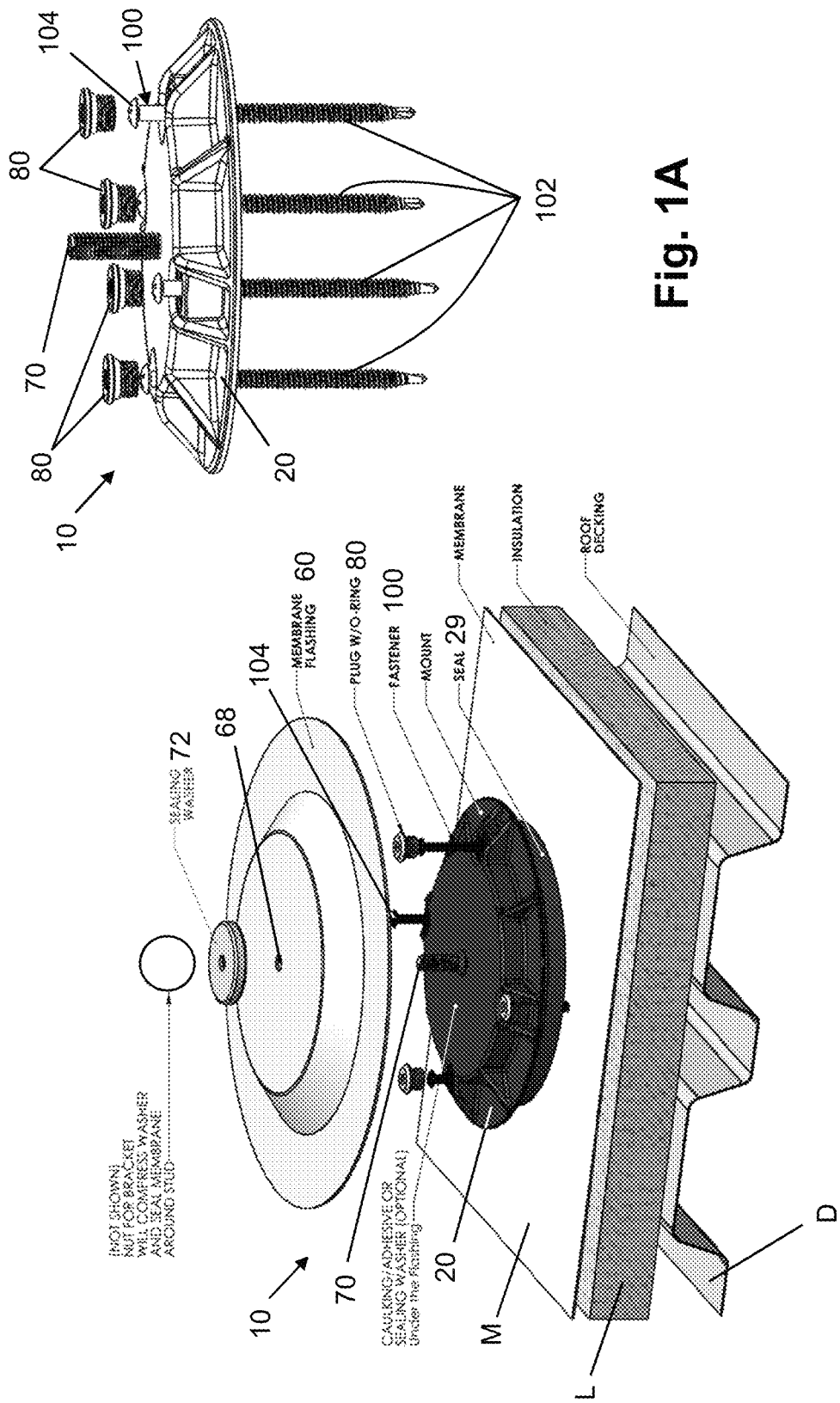

ROOF MOUNT ASSEMBLY WITH STABILIZED FASTENER MATRIX

CROSS-REFERENCE TO RELATED APPLICATION

This application is a continuation of Ser. No. 16/779,933, filed on Feb. 3, 2020 for Roof Mount Assembly with Stabilized Fastener Matrix, the entire content of which is incorporated herein by reference.

BACKGROUND

This disclosure relates generally to anchor/mount assemblies which are employed to secure equipment to a roof. More particularly, this disclosure relates to anchor/mount assemblies which are specially adapted to secure equipment, such as a rack system to attach a solar panel, to a flat roof.

Equipment, such as rack systems supporting solar panels, heat exchangers, air conditioners, communication equipment, etc., is commonly mounted to a flat roof of buildings and other industrial structures. A rack or frame is typically connected to the roof at multiple points by various mount assemblies. The mount assemblies function as connectors and supports. Numerous conventional roof mount assemblies dictated by their structural configuration are installed to flat roofs by techniques that jeopardize the integrity of the roof. It is common, for example, to cut through the upper roofing membrane and an insulation layer to obtain access for connecting to the underlying roof structure.

One type of mounting assembly addresses the roofing integrity issue by employing multiple elongated fasteners to bridge the connection with the roof support structure and the mounting assembly. However, the mechanical integrity of the latter roof mount system can be jeopardized by the use of fasteners which extend from the roof mount assembly through the roofing layers to the roof support structure. The spacing between the anchoring region of the fasteners to the roof support structure and the connection with the roof mount assemblies is prone to introduce instability, loosening and otherwise interfere with the effective retention of roof mounted equipment over time.

It is highly desirable to provide a roof mount system which is adapted for a flat roof and can be efficiently installed without jeopardizing the integrity of the roof to provide an effective and mechanically sound connection for supporting equipment above the top of the roof and which effectively and efficiently seals with the roof.

SUMMARY

Briefly stated, a roof mount assembly in one preferred form comprises a base with a central platform and a lower circumferential surface. The base defines a plurality of angularly spaced stepped bores. Each bore forms a retainer rim defining a lower opening and an upper enlarged threaded bore. The base mounts a projecting connector at a central location. Roofing fasteners each having a flat head are receivable in the lower opening and securable against the rim. Plugs each having a flat lower surface are threadably engageable in a threaded bore so that the flat lower surface engages a flat head of a fastener. The platform preferably has a threaded aperture, and a connector comprises a bolt having a threaded shank extending through and threadably engaged in the aperture and projecting from the platform.

A flashing preferably covers the base and the plugs. Each plug comprises a head defining a socket and an integral threaded shank having a terminus defining the flat lower surface. A seal ring is mounted to the shank to seal the stepped bore. In one preferred embodiment, there are four stepped bores and four plugs.

In another embodiment, a roof mount assembly comprises a bottom plate having a rigid body defining a plurality of angularly spaced arcuate slots. An elongated fastener having a head is receivable and retainable in each of the slots. A top plate is mountable onto the bottom plate. The top plate has a crown mounting a projecting connector at a central location. The top plate has an underneath surface that extends over the head of each elongated fastener received in the slots of the bottom plate. The top plate is secured to the bottom plate by plate securement fasteners.

The bottom plate has a substantially circular peripheral edge, and the slots are equiangularly spaced and equidistantly spaced from the peripheral edge. The bottom plate has a plurality of angularly spaced tapped bores. The top plate has a plurality of openings alignable with the bores. The plate securement fasteners are preferably bolts extending through the openings and threadably engaged in the bores. The bolts preferably have a flange-like head which defines a socket.

A roof mount assembly comprises a first plate having a plurality of angularly spaced arcuate slots and a plurality of threaded first openings. A second plate has a crown with a connector projecting from the crown. The second plate also has a plurality of second openings which are alignable with the threaded openings of the first plate. The second plate also has an underside with a generally planar annular portion. A compressible membrane is mounted to the underside. Roofing fasteners are receivable within the slots and are securable therein. Plate fasteners are receivable in the second openings and engageable in the first openings to clamp the plate second with the first plate. The membrane is compressibly sandwiched between the first and second plates upon engaging the plate fasteners in the threaded openings.

There are preferably four substantially identical arcuate slots and each of the slots has a recessed periphery. The second openings are equidistantly angularly spaced about the connector. There are preferably four second openings. The crown preferably has four substantially identical spaced recesses each having a planar surface defining a second opening. Each plate fastener has a retaining washer and a sealing ring. The first plate has a fastener head receiver side and an opposite side defining at least one peripheral angular groove. A compressible sealing member is mounted to the opposite side.

In one embodiment, a roof mount assembly comprises a base having a platform and a peripheral flange with a generally planar underside. The base has a plurality of angularly spaced stepped bores each having an engagement rim and a threaded portion and extending through the underside. A connector projects from a central location of the platform. Roof fasteners each having a head and receivable in the bore are engageable against the rim. Plugs having a distal end are engageable in the threaded portion so that the plug end engages the fastener head. There are preferably four stepped bores and four plugs. Each plug has a flange-like head defining a socket. Each plug mounts a sealing ring which seals the stepped bore.

In another embodiment, a roof mount assembly includes a bottom plate having a body defining a plurality of angularly spaced holes extending from a top surface to a bottom surface. The bottom plate further includes a first compressible sealing pad affixed to the bottom surface. A plurality of first elongated fasteners with each of said first elongated fasteners extending through one of the holes in the top plate and into a roofing structure secure the bottom plate to the roofing structure with the first sealing pad compressed between the bottom plate and roofing structure. A top plate is mountable onto the bottom plate. The top plate has a crown mounting a projecting connector at a central location and a second compressible sealing pad affixed to an underneath surface. The top plate is secured to said bottom plate by second fasteners extending through holes in the top plate and into threaded bores in the bottom plate with the second compressible sealing pad compressed underneath the underneath surface.

BRIEF DESCRIPTION OF THE DRAWINGS

FIG. 1 is an annotated exploded perspective view of a roof mount assembly with stabilizer plugs illustrating the installation of the assembly to a flat roof, a representative portion of which is illustrated;

FIG. 1A is an enlarged portion, portions removed, of the roof mount assembly of FIG. 1;

DETAILED DESCRIPTION

Uni-Base Roof Mount Assembly

With reference to the drawings wherein like numerals represent like parts throughout the figures, a roof mount assembly which is characterized by a uni-base feature and employs stabilizer plugs ("uni-base roof mount assembly") is generally designated by the numeral 10. The roof mount assembly 10 is particularly adapted for securing a rack or frame of rooftop equipment such as a solar panel, an air conditioner, a heat exchanger, a communication module, etc., to a flat roof. The roof mount assembly 10 is particularly configured so that it can be efficiently installed to the flat roof without jeopardizing the integrity of the roof itself while also providing a highly stable anchor and securement connection for the equipment and allowing for an effective water seal for the installed uni-base roof mount assembly.

The uni-base roof mount assembly 10 is illustrated as it may be installed in connection with a representative flat roof system comprising an underlying corrugated roof decking D, an overlying insulation layer L and a water impervious membrane M. The roof mount system 10 is mounted on top of the roofing system and secured by roofing fasteners to the corrugated roof decking. The roof mount assembly 10 may also be employed with alternative roof support structures.

Figure 1B:
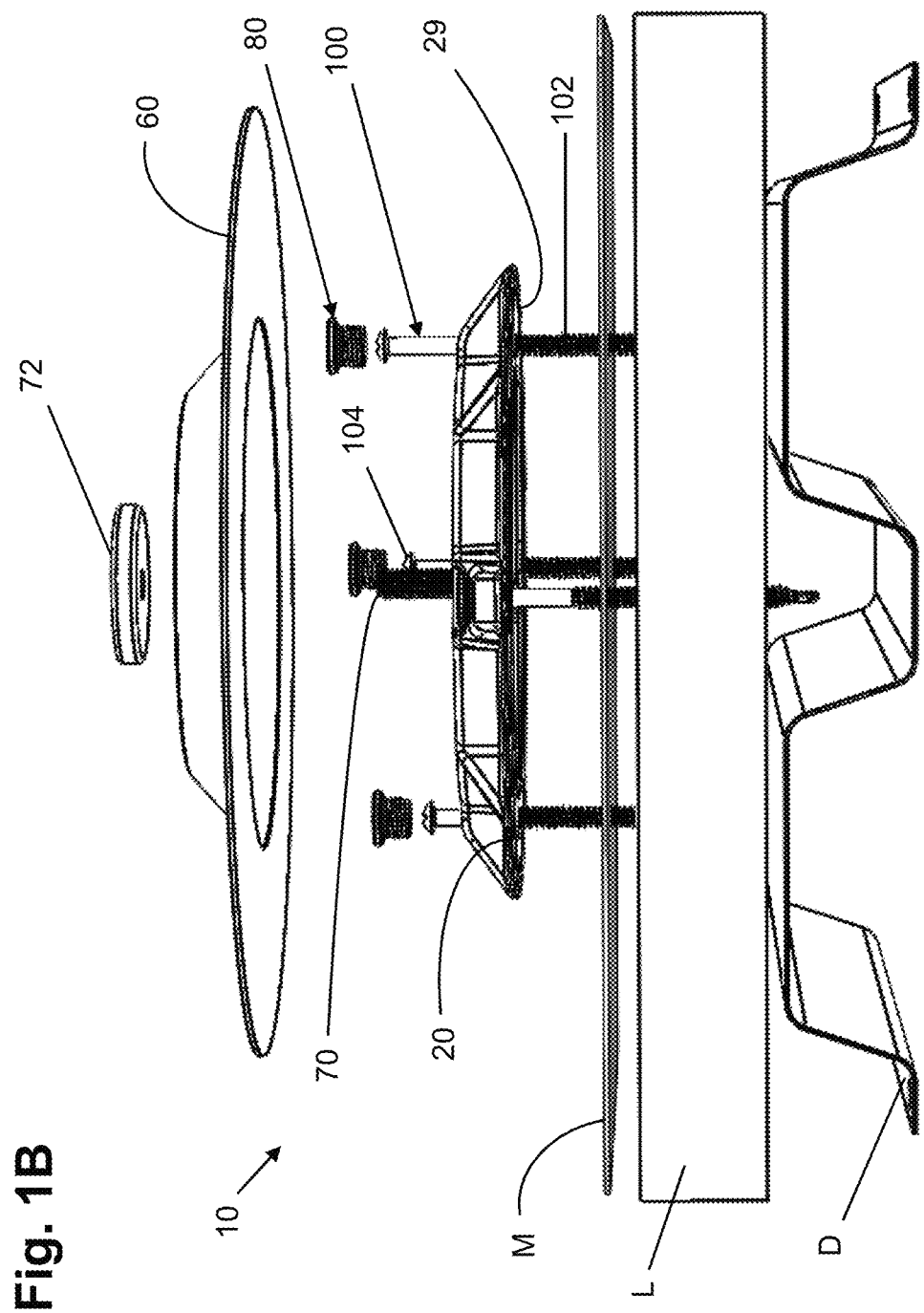
FIG. 1B is an enlarged exploded view of the roof mount assembly of FIG. 1 from a different perspective.
Figure 2:
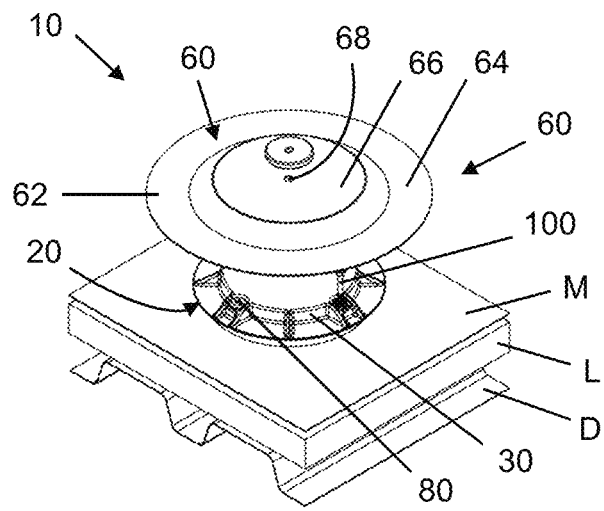
FIG. 2 is a perspective view of the roof mount assembly installed to a roof in a second installation stage.
Figure 3:
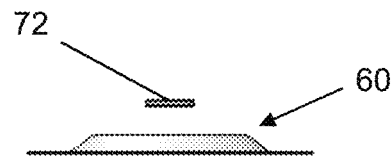
FIG. 3 is an exploded side elevational view of a membrane flashing and sealing washer for the roof mount assembly of FIG. 1.
Figure 4:
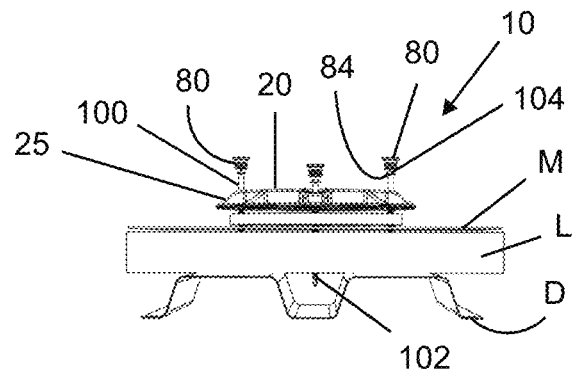
FIG. 4 is a side view, partly in schematic, illustrating the installation and structure of a roof mount assembly.
Figure 5:
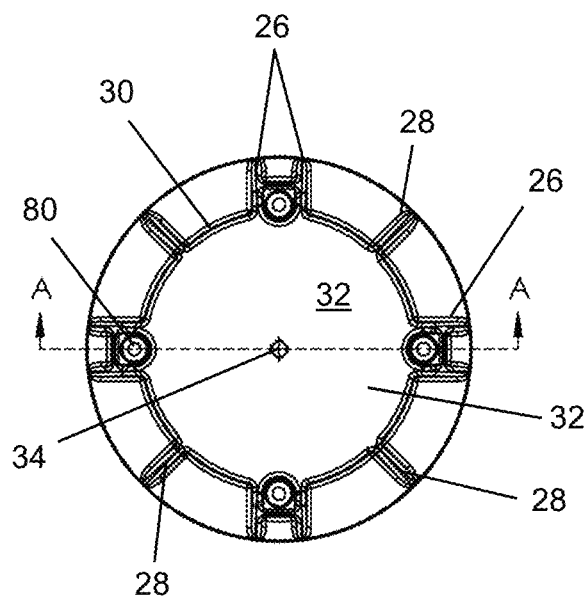
FIG. 5 is a top plan view of a base for the roof mount assembly of FIG. 1.
Figure 6:
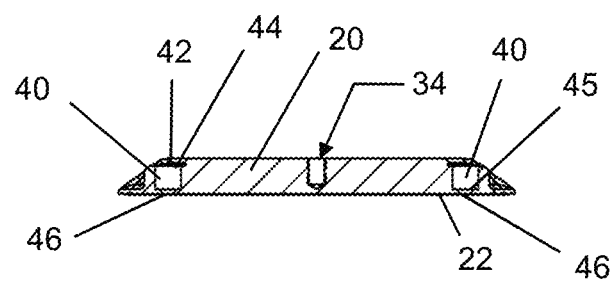
FIG. 6 is a sectional view of the base of FIG. 5 taken along the lines A-A thereof.
Figure 7:
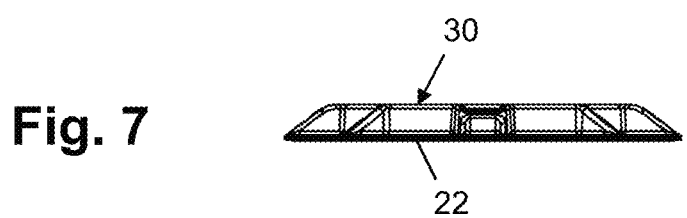
FIG. 7 is a side elevational view of the base of FIG. 5.
Figure 8:
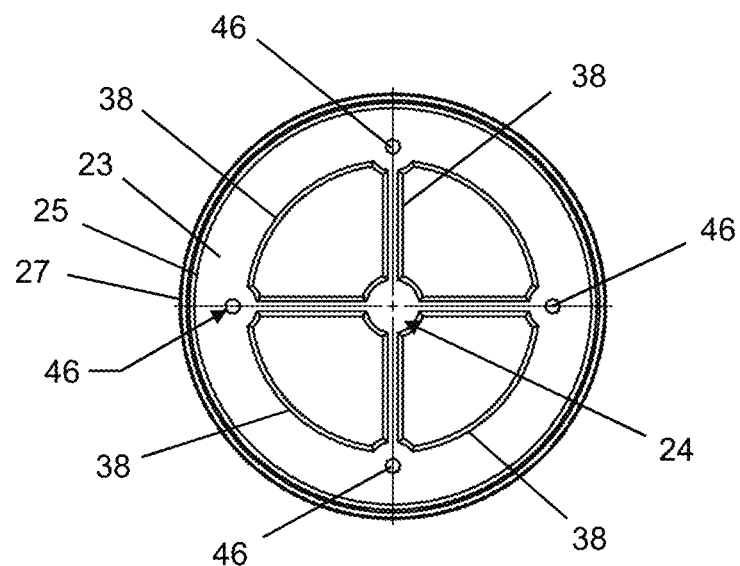
FIG. 8 is a bottom plan view of the base of FIG. 5.
Figure 9:
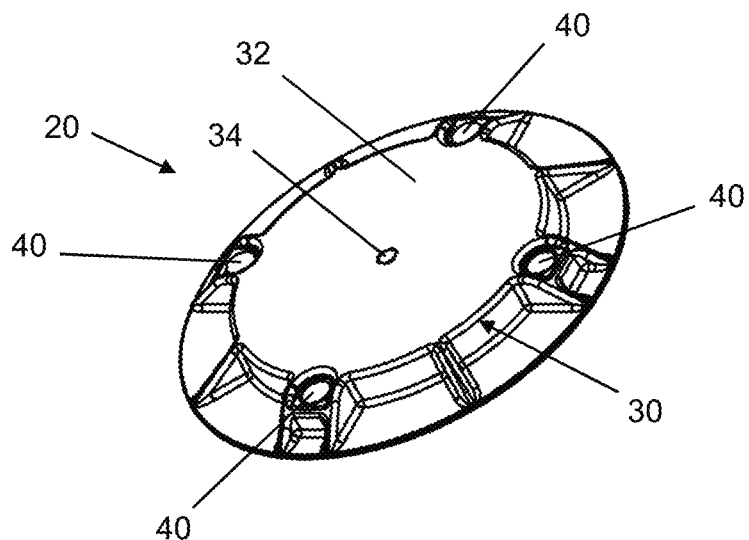
FIG. 9 is a perspective view of the base of FIG. 5.

The principal structure of the uni-base roof mount system 10 is an axially symmetric one piece base 20 which is preferably formed from metal or other rigid material, such as plastic, having a high degree of structural integrity. The base 20 includes a planar lower surface 22. The lower surface has an underside 23 with a generally planar annular portion and peripheral coaxial annular grooves 25 and 27 (FIG. 8). The lower surface 22 integrally connects with a coaxial central platform 30 having a planar upper surface 32. The base forms a central opening 24 which coaxially leads to an upper reduced diameter tapped hole 34 which may have a ⅜-16 thread tap. The base 20 has a 6½ inch diameter in one preferred embodiment.

Four substantially identical fastener columns of equiangularly spaced stepped bores 40 are formed at the periphery of the platform and function to partially define a stabilizing structure for a fastener matrix. The stepped bores 40 are substantially identical in shape and dimension. Each bore 40 has an upper threaded bore 42 with a slight upper chamfer 44 and downwardly extends to a reduced diameter opening 46. Each opening 46 is preferably 0.266 inches in diameter. The transition between the stepped bore forms an annular coaxial retainer rim 45. The quantity of stepped bores 40 other than four are possible for some embodiments.

The base 20 preferably has a pair of angled buttresses 26 which extend from the upper surface of the base to the side of the platform. In addition, another set of buttresses 28 may extend at equi-angularly spaced positions between the stepped bores 40. Various vertical support partitions 38 extend below the platform 30 and terminate at the lower surface 22.

Figure 10:
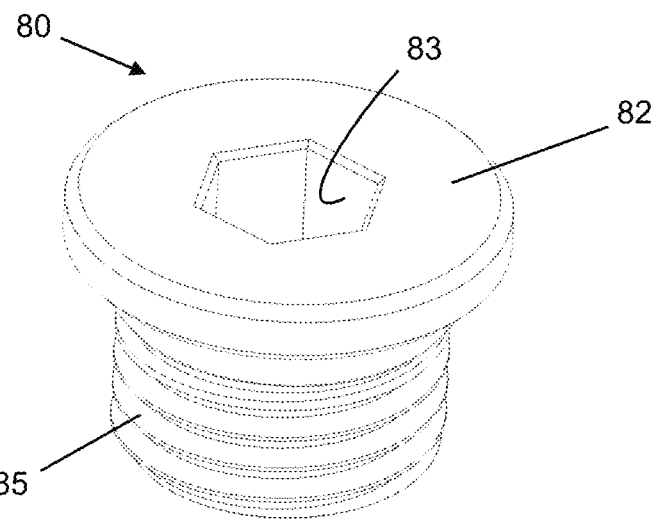
FIG. 10 is an enlarged top perspective view of a plug employed in the roof mount assembly of FIG. 1.
Figure 11:
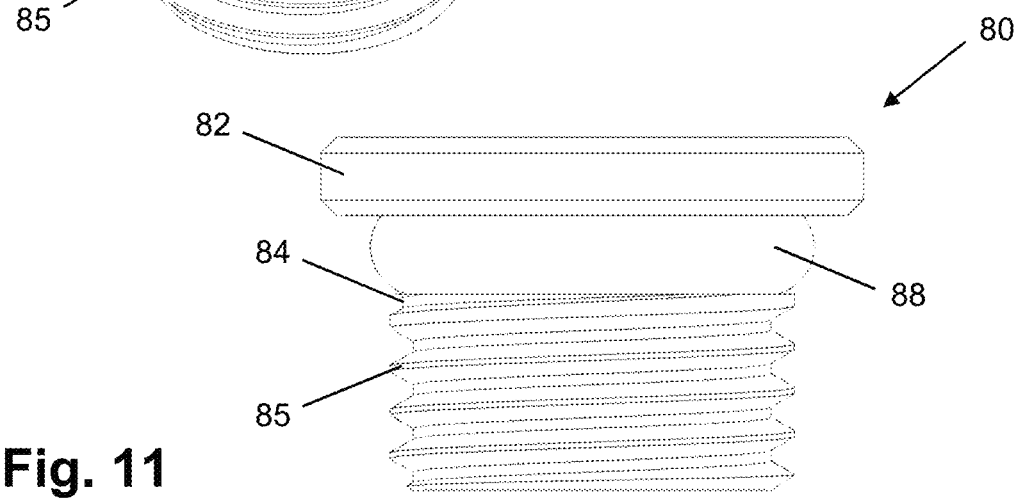
FIG. 11 is a side elevational view of the stabilizer plug of FIG. 10.
Figure 12:
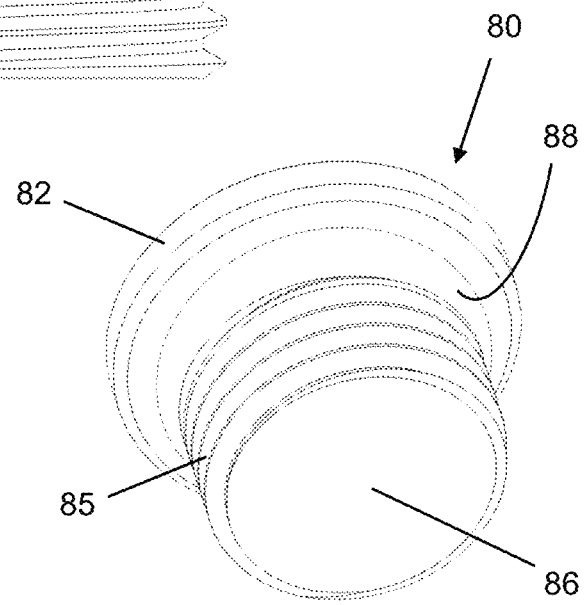
FIG. 12 is a bottom perspective view of the stabilizer plug of FIG. 10.

A key feature of the uni-base roof mount assembly 10 is the usage of stabilizer plugs 80 which are best illustrated in FIGS. 10-12. The stabilizer plugs 80 are preferably substantially identical. The plugs include a flange-like head 82 with a central hex socket 83. An integral truncated shank 84 extends from the head and has a threaded portion 85 complementary to the thread of the stepped bore 42 and a flat surface 86 at the opposed shank terminus. A sealing ring 88 is disposed on the shank adjacent the underside of the head.

Figure 13:
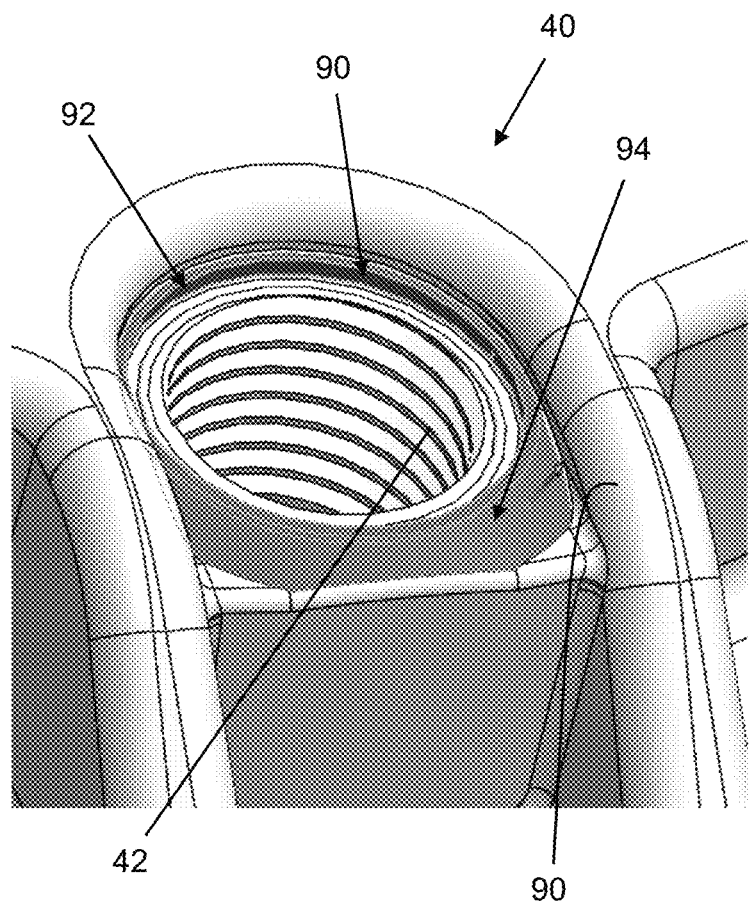
FIG. 13 is an enlarged view of an embodiment of a stepped bore in a base for use in the disclosed assembly.

With reference to FIG. 13, in one embodiment, the stepped bore 40 includes a slight radial surface 90 to accommodate the O-ring 88 of the plug 80. A shoulder 92 forms a positive stop above the radial surface 90. In operation, the shoulder 92 forms an abutment surface for the circumferential flange 82 formed in the head of each plug 80. The surface-to-surface abutment between the flange 82 and shoulder 92 provides a secure installation and prevents overtightening of the plug 80. Further, when installed in this manner, the O-ring 88 is positioned securely within the space formed by the radial surface 90 to provide a fluid tight seal between the plug 80 and the base 20 with the flange 82 completely concealing the O-ring 88 from outside elements that could degrade the material, such as for example, UV light and water. The flange 82 is dimensioned so that, upon tightening, it does not extend above the upper surface 32 of the platform, and the upper flange/head surface is preferably substantially coplanar with surface 32.

The base 20 also preferably includes a sloped surface 94 adjacent each of the bores 40. The surface 94 is angled from an edge of the bore 40 downward toward the radially outside portion of the base 20. The base 20 may also include elevated rails, like that shown as reference numeral 96 (FIG. 13). This configuration promotes water run-off away from the bore 40 and off of the base 20 to improve water sealing properties of the base.

The roof mount assembly is secured to the roof by interposing a seal member 29 between the lower surface 22 of the base and the membrane M of the roof. Roofing fasteners 100 which have an elongated threaded shank 102 with a distal tip and have a flat head 104 are inserted through the openings 46. The fasteners are driven or torqued so that they are secured to the underlying roof structure or decking D. Fasteners 100 are preferably OMG roofing fasteners for specific roof materials marketed by OMG, Inc. of Agawam, Massachusetts. The underside of the fastener heads 104 engage the annular rims 45 of the stepped bores 40.

A plug 80 is then threaded into each threaded bore 42 and torqued via a bit inserted into socket 83. Each plug is driven to a tightened position so that the flat lower surface 86 of the plug engages the flat head surface 104 of the fastener. It will be appreciated that the surface-to-surface engagement essentially urges and maintains the fasteners 100 in parallel relationship in a substantially perpendicular relationship with the base 20 and the roof structure decking D to form a highly stabilized matrix of engaged fasteners. Each bore 40 is efficiently sealed by an O-ring 88.

Although it is preferred that the fastener head and plug lower surfaces be flat, at least one of the surfaces for some embodiments are not flat, but nevertheless engage to provide the advantageous fastener orientation and stability.

A membrane flashing 60 preferably has a conformed geometry which closely fits over installed fastened base 20. The preferred flashing 60 includes a peripheral annular skirt 62 and a truncated conical central cover 64 including a planar top surface 66 which is generally complementary to that of the upper surface 32 of the base and is angled to accommodate the upper edges of the buttresses 26 and 28. The membrane flashing 60 includes a central opening 68 which aligns with the central base tapped hole 34. A bolt 70 or other fastener is inserted from the underside of the base into the central opening 24 and threaded into the tapped hole 34 so that it projects above the base and is received through the flashing opening 68. A sealing washer 72 is inserted over bolt 70 to engage the top surface 66 of the membrane flashing 60. In another embodiment, the sealing washer 72 is secured directly on top of the base 20 between the base 20 and the membrane flashing 60.

A nut is typically threaded to the bolt 70. The bolt 70 preferably receives a bracket which connects with the equipment, a rack and/or the equipment frame. The bracket and nut are not illustrated.

The membrane flashing 60 is positioned over the base 20 and the plugs 80 so that the bolt 70 extends upwardly through the hole 34, and the exposed bolt 70 receives a sealing washer 72. A nut secures the membrane to the base so that the membrane skirt 62 engages and seals against the membrane M of the roofing. The bolt 70 may then be employed to fasten the equipment and/or frame in position. Connectors other than bolts, such as hooks, brackets, shafts, etc., may be employed. The membrane flashing 60 is optional for some installations of the uni-base roof mount assembly 10.

Two-Part Base Roof Mount Assembly

FIGS. 14-22 depict members of embodiments of roof mount assemblies 110 and 210. Roof mount assembly 110 (FIG. 19) is adapted for use in PVC roof applications, and roof mount assembly 210 (FIG. 21, 22) is adapted for use in non-PVC roof applications. Each roof mount assembly embodiment preferably has an axially symmetric two-part base formed from a generally circular bottom plate 120 and a generally circular multi-level top plate 130. The assembled plates form a low profile and cooperate to allow for a high degree of fluid sealing integrity and a wide range of fastener positions depending on the roof configuration. Upon installation, the roof mount assemblies provide a durable and reliable structure of a high degree of connection integrity. The sealing of the roof mount assemblies with the roof can be accomplished in an orderly, neat manner which facilitates ready inspection.

Figure 15:
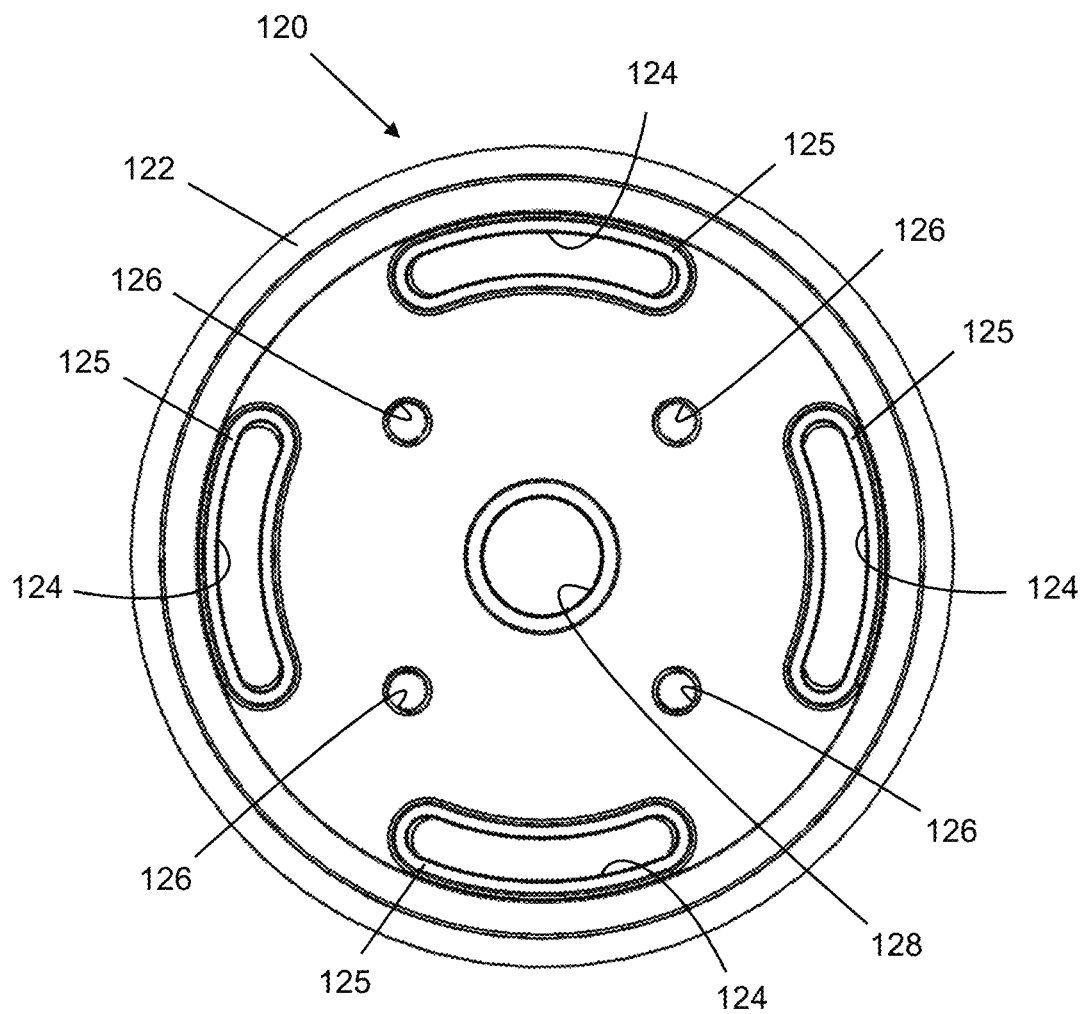
FIG. 15 is a top plan view of the lower plate of the roof mount assembly of FIG. 14.
Figure 16:
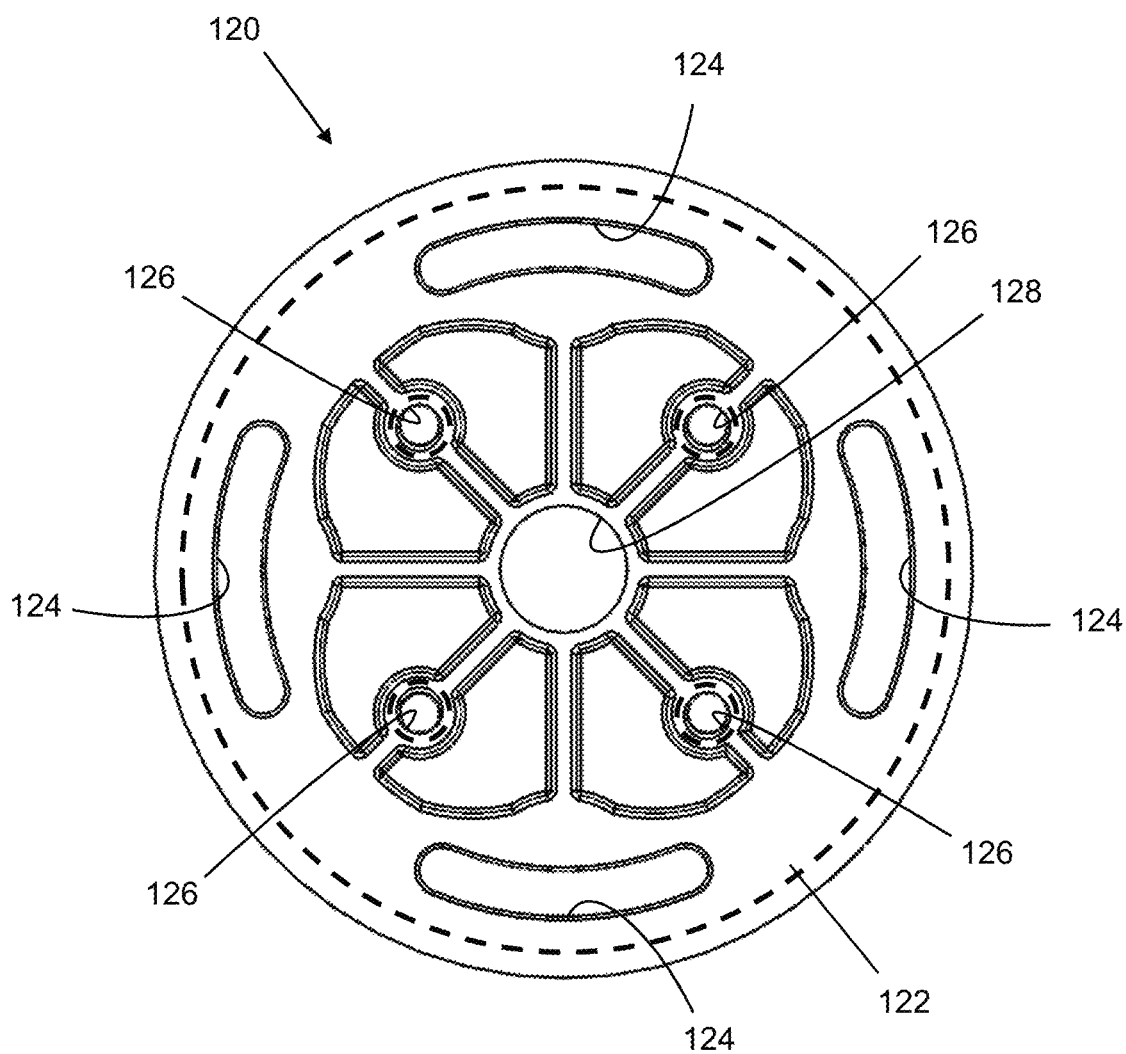
FIG. 16 is a bottom plan view, partly diagrammatic, of the plate of FIG. 15.

As shown in FIGS. 15 and 16, the bottom plate 120 includes a solid body 122 provide a substantially circular footprint. Multiple circumferentially extending arcuate slots 124 are spaced from one another along the radially outer portion of the body 122. The slots have a recessed border 125 to accommodate peripheral portions of the fastener heads. The slots 124 are preferably identical in shape and are preferably equiangularly spaced. Each of these slots 124 defines an adjustable attachment opening for receiving one or two (possibly more) elongated fasteners 100 depending on the substrate.

The body 122 also defines a plurality (preferably four) of secondary holes 126 and a central tapered opening 128. The secondary holes 126 are tapped to receive a bolt 140 and are equidistantly spaced from the center of the plate 120 at a medial angular location between the slots 124. Each bolt 140 preferably has a hex head 142 and a threaded shank 144 which mounts a washer 146 and a sealing gasket 148.

Figure 14:
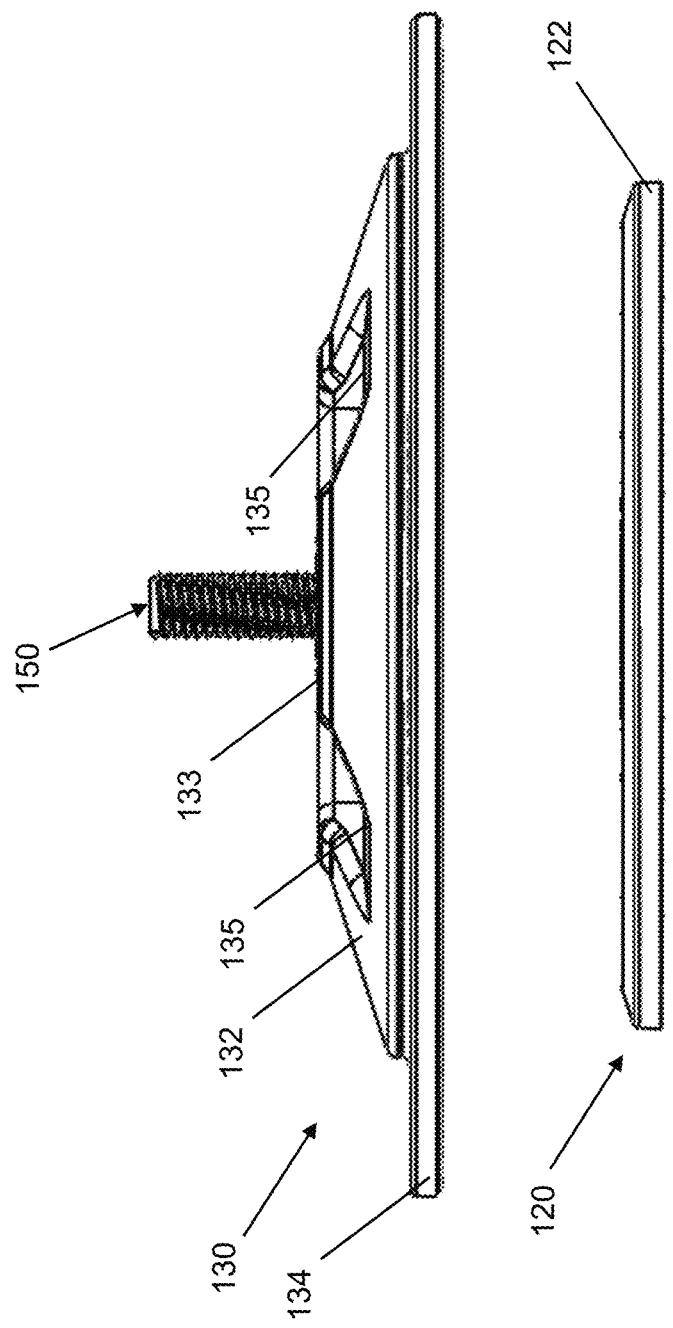
FIG. 14 is an enlarged side elevational view of two plates employed in another embodiment of a roof mount assembly.
Figure 17:
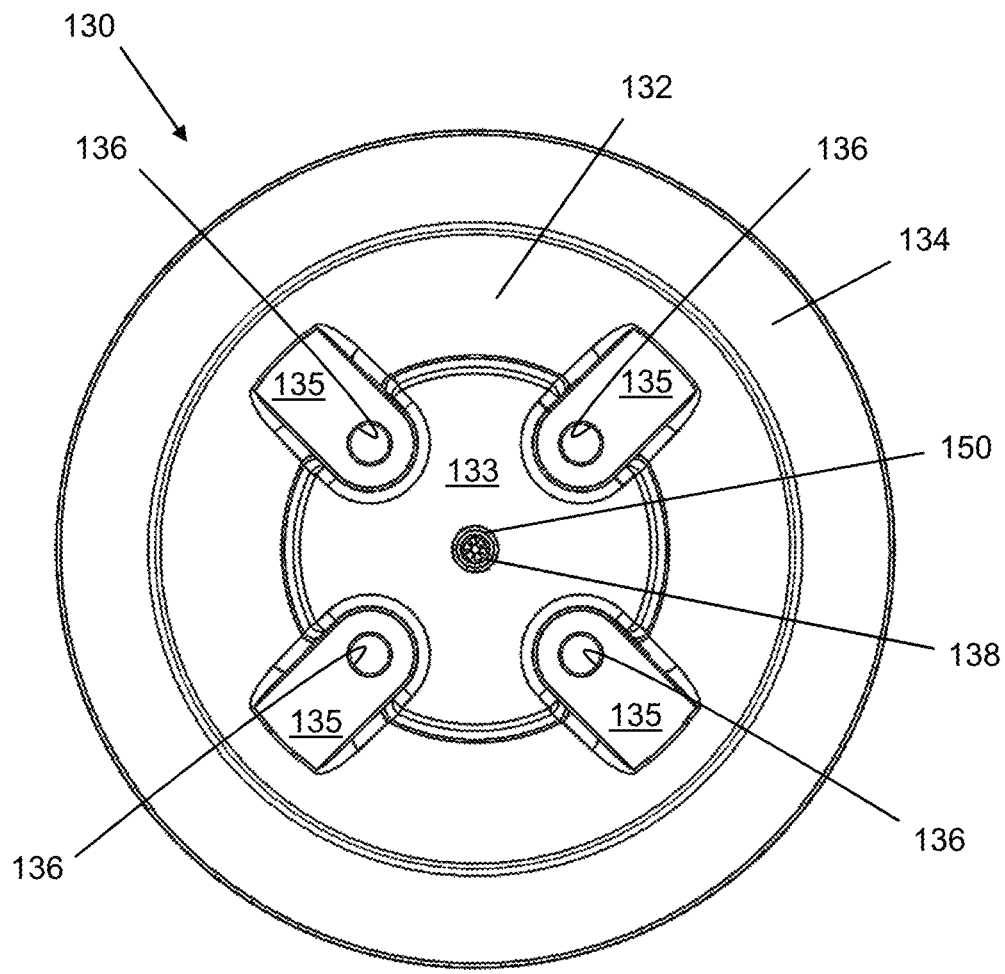
FIG. 17 is a top plan view of the top plate of the roof mount assembly of FIG. 14.
Figure 18:
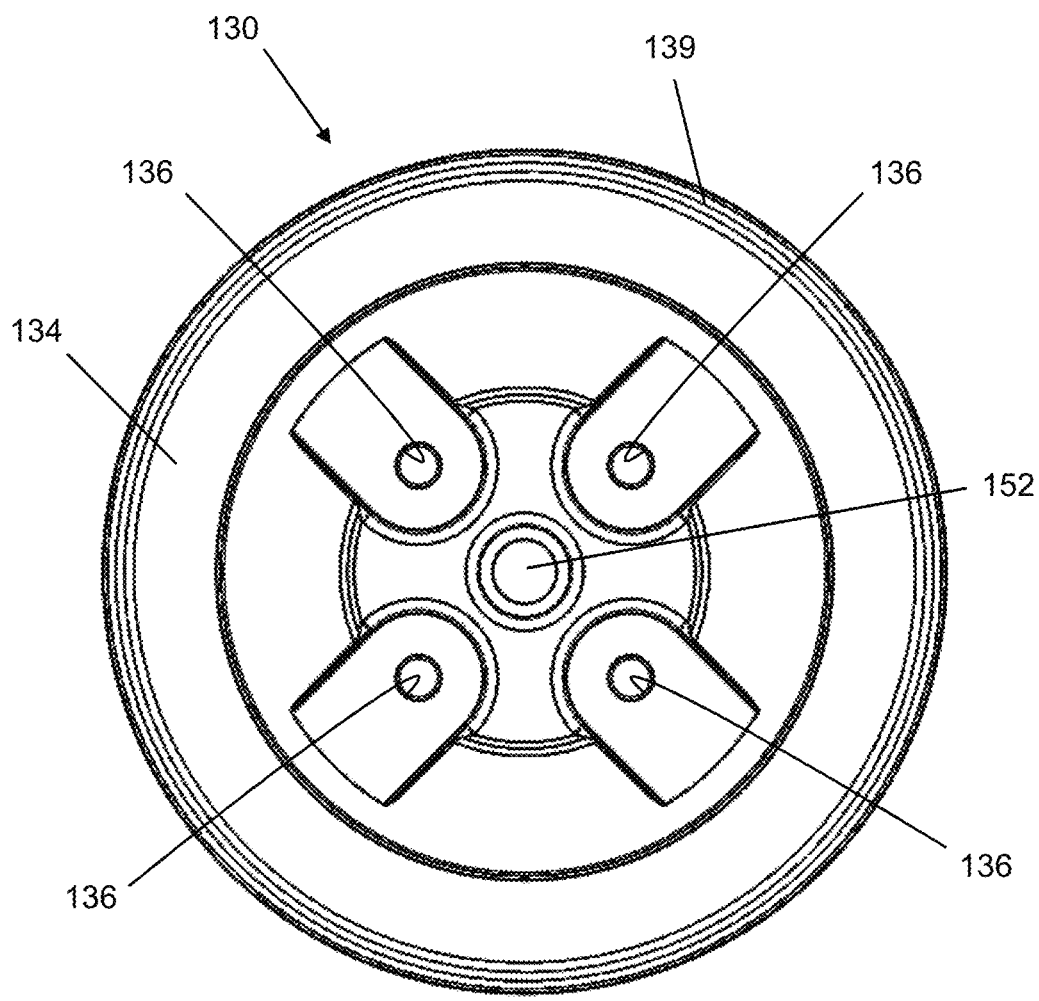
FIG. 18 is a bottom plan view of the plate of FIG. 17.
Figure 19:
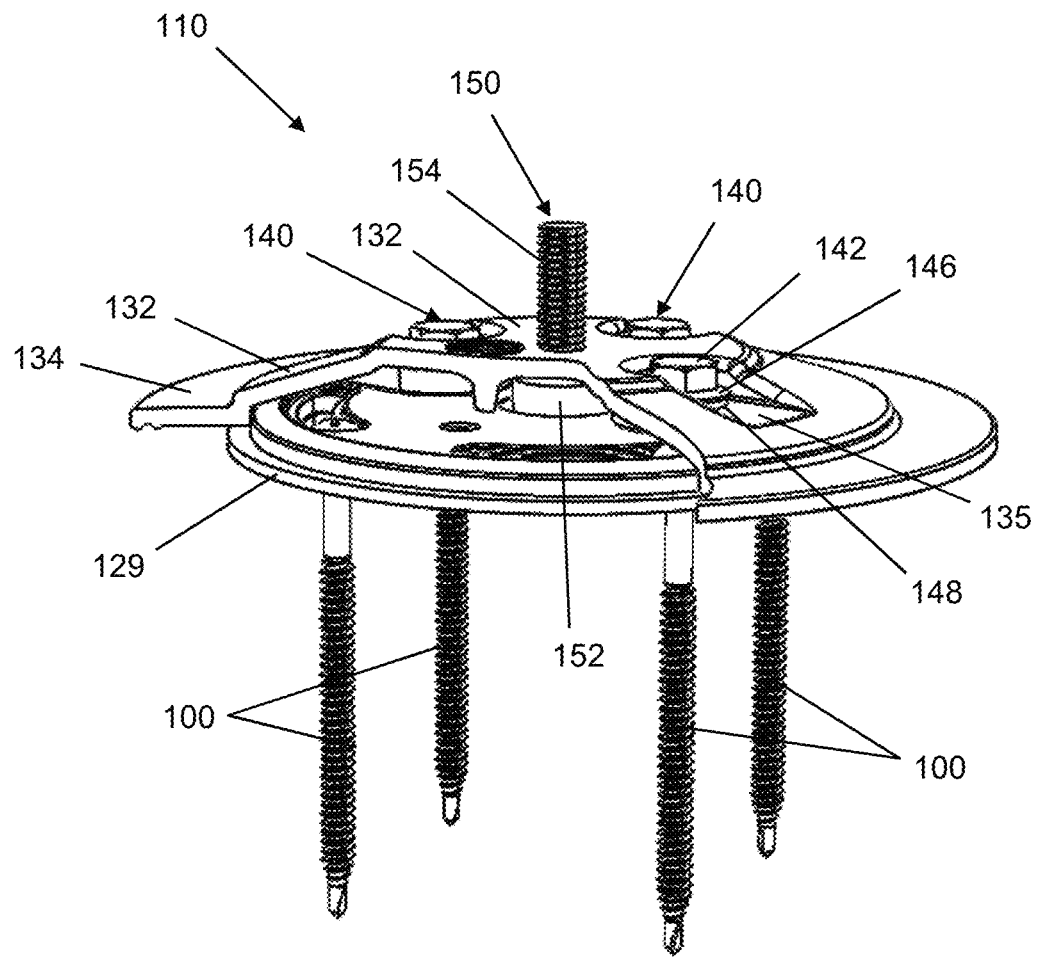
FIG. 19 is a perspective view, partially cut away, of an embodiment of the roof mount assembly employing the two plate configuration of FIG. 14.

With reference to FIGS. 14, 17 and 18, the top plate 130 has a diameter greater than that of plate 120. In one embodiment, the top plate 130 and bottom plate 120 have diameters of 7 inches and 5 inches, respectively. The top plate 130 includes a central truncated crown 132 with a flat upper surface 133 and a radially outer peripheral flange 134. The underside of the flange defines has a generally planar annular portion and an annular groove 139 adjacent the periphery.

The crown 132 has a central tapped aperture 138. The crown 132 defines four equiangularly spaced identical recesses 135 surrounding cylindrical attachment bores 136 which are equiangularly spaced about the central tapped aperture 138. The recesses 135 are coplanar and are dimensioned to allow for tightening and sealing of the bolts 140. Upon tightening of the bolts 140, the tops of the heads do not extend above upper surface 133 and are preferably substantially coplanar with surface 133.

A connector bolt 150 having a head 152 and a threaded shank 154 is threaded to the aperture and extends longitudinally from the crown to provide the anchor connecting structure for the roof mount assembly.

In a typical installation for PVC application, a bead of water block sealant is applied as continuous beads around the underside edge of the base plate 120 and the tapped secondary holes 126. The preferred sealant location is illustrated by broken lines in FIG. 16. Alternatively, the plate 120 may then be placed over a sealing member 129. The bottom plate 120 is placed on top of the membrane M. The plate 120 is then secured via fasteners 100 driven through the slots 124 into the deck D.

A proper secure attachment requires the fasteners to align with peaks or valleys, and not on an angled portion, in the corrugated roof deck D. However, since the membrane M and insulation layer L conceal the deck D from view of an installer, fastener/peak (or valley) alignment can be challenging. The elongated and circumferentially extending configuration of the slots 124 allows an installer to circumferentially adjust the positioning of the bottom plate 120 mid-installation. For example, if an installer begins an installation by driving a first fastener through a first slot 124 into a peak in the decking D, but misses a peak with the second fastener, he can either: (1) adjust the circumferential position of the second fastener within the respective slot or (2) loosen (but not remove) the first fastener, thereby allowing rotation of the bottom plate 120 with the first fastener remaining stationary and the first slot 124 angularly sliding relative to the first fastener until a portion of the second slot is aligned with a peak in the corrugated deck D.

The installer can continue installing via optional adjustment of the bottom plate 120 in the same manner for the third and the fourth fasteners. The fasteners 100 can be driven through at any position within a respective slot 124, which allows facile adjustment via rotation of the bottom plate 120 to align all fasteners with a peak in the deck D. It is preferred that the fasteners 100 be sequentially driven in a criss-cross pattern. It should also be noted that multiple fasteners can be driven through a slot. The latter can be advantageous if greater holding force is required.

After the bottom plate is attached as described above, the top plate 130 is mounted over the secured bottom plate 120. Each of the attachment holes 136 in the top plate 130 align with a hole 126 in the bottom plate 120. The outer edge of the bottom plate 120 and/or portions of the inner face of the dome 132 can be fit with a sealing member to help affect a fluid-tight seal around the bottom plate. When the top plate 130 is mounted on the bottom plate 120, the outer rim 134 lays substantially flat on the roof membrane M around the outer edge of the bottom plate 120 and the head 152 is received in the central opening 128 of the bottom plate. The fasteners 140 are tightened through the aligned opening 136 into the tapped holes 126 to secure the top plate 130 to the bottom plate 120 and the roof.

Additional sealing members are optionally added or incorporated into the top plate 130, such as caulking around the outer edge and/or fastener heads and/or additional O-rings.

When installed, the top plate 130 firmly cooperates with the bottom plate 120 to provide positional stability for the fasteners 100 that are installed within the slots 124 in the bottom plate 120 to urge and maintain the fasteners 100 in parallel relationship in a substantially perpendicular relationship with the base bottom plate 120 and the roof structure decking D.

Figure 20:
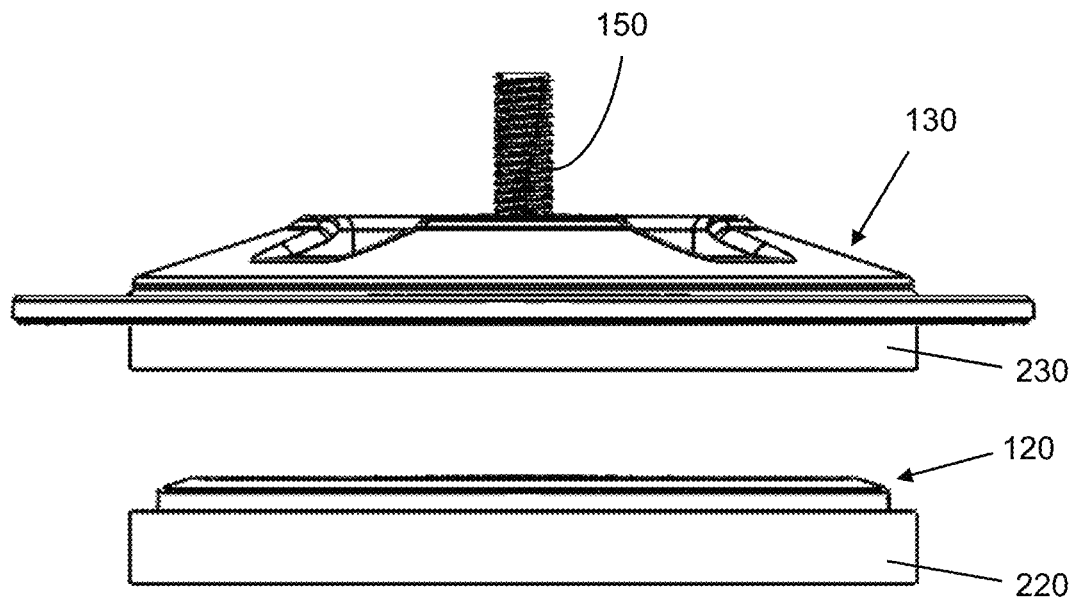
FIG. 20 is a side elevational view of two plates for a modified embodiment of the roof mount assembly of FIG. 19.
Figure 21:
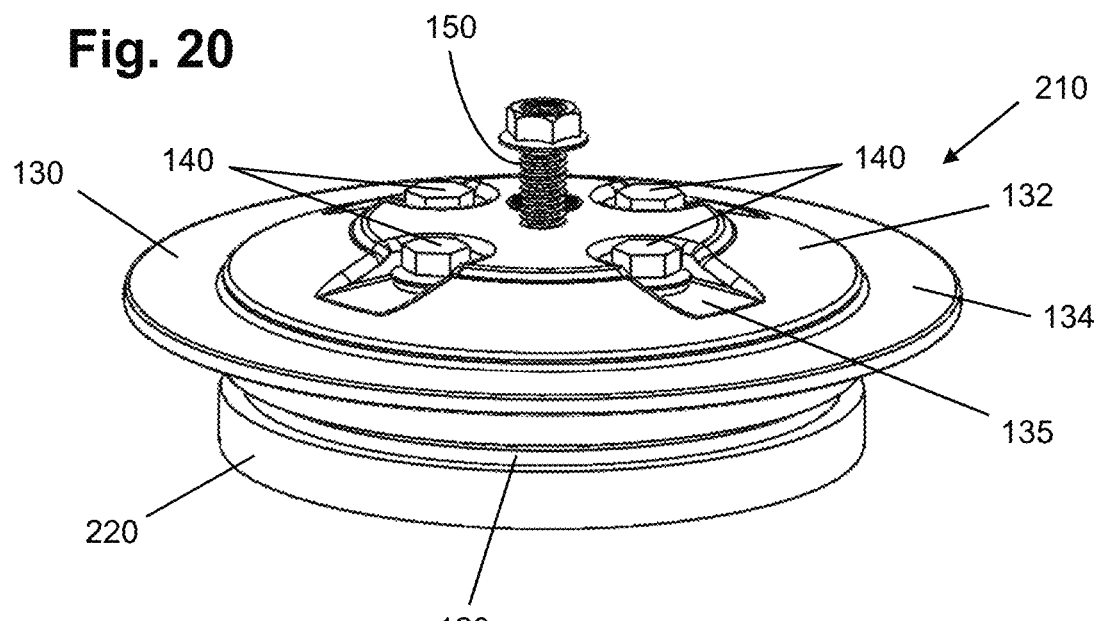
FIG. 21 is a perspective view of a modified roof mount assembly employing the plates of FIG. 20 with the roofing fasteners omitted.
Figure 22:
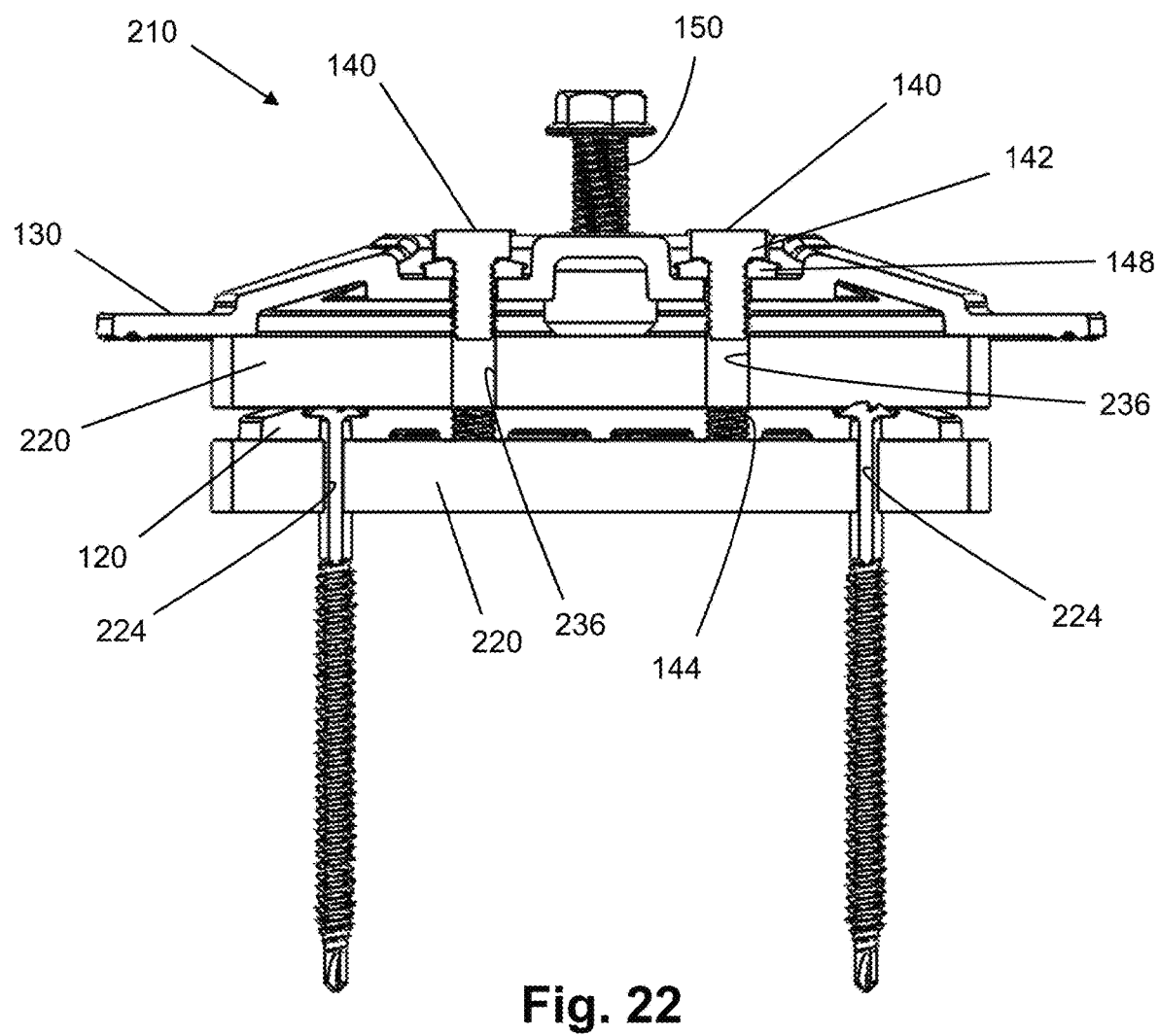
FIG. 22 is a side perspective view, partially cut away, of the modified roof mount assembly of FIG. 21.

With reference to FIGS. 20-22, roof mount assembly 210 is particularly adapted for non-PVC roof application. The upper plate 130 is affixed with a circular foam sealing pad 230, and the bottom plate 120 is also affixed with a foam sealing pad 220. The sealing pads 220 and 230 are highly compressible. The compressibility is preferably at least 50% and as high as 90%. One preferred material for the sealant pads 220 and 230 is a pre-compressed silicone/impregnated foam hybrid material marketed under the trademark EMSEAL™ by Emseal Joint Systems Ltd. of Westborough, Massachusetts. The pads 220 and 230 are attached by an epoxy adhesive to the underside of each of the plates 120 and 130. Pad 220 preferably has openings 224 aligned with the slots 124 and a central opening. Pad 230 preferably has openings 236 aligned with openings 136 and an opening aligned with central aperture 138.

The installation is accomplished by initially mounting the bottom plate 120 with the foam pad 220 onto the roof for non-PVC roof systems by use of the fasteners 100, as previously described. The bottom edge will be visibly compressed upon tightening the fasteners 100.

A continuous unbroken bead of water block sealant is preferably applied to the underside of the top plate flange 134. In one preferred application, the bead is approximately ⅜ inches in diameter and tightly surrounds the sealant pad 230. The top plate 130 with sealant pad 230 is then laid onto the plate 120 so that the fastener openings 136 are aligned with the threaded holes 126 in the base ring plate 120. The four bolts 140 are then tightened (preferably in a criss-cross pattern to 60-70 inch pounds) to secure the cover plate to the base plate so that the neoprene gasket sealing ring 148 on the bolt slightly bulges under the washer 146 and the tops of the bolts do not extend above platform surface 133. In a preferred installation, the water block sealant is squeezed out around the edge of the flange in a continuous bead of approximately ¼ to ⅜ inch. It will be appreciated that the roofing fasteners are maintained in a substantially perpendicular matrix relative to the roof by the cooperation of the plates and somewhat by the compression applied by the top plate 130 via the intermediate sealant pad 230 against the tops of the fasteners 100.

Like the installation described for roof mount assembly 10, a membrane flashing may optionally be secured over the top plate 130 for a further fluid barrier. The membrane flashing may be welded or glued depending on the membrane type. The bolt 150, fastener or attachment member projects from the top of the dome 132 to be used to secure an object, such as a rack or frame, to the roof.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A roof mount assembly comprising:
   a bottom plate having a body defining a plurality of angularly spaced holes extending from a top surface to a bottom surface, the body including a first compressible sealing pad affixed to the bottom surface;
   a plurality of first elongated fasteners with each of said first elongated fasteners extending through one of the holes in the bottom plate and into a roofing structure to secure the bottom plate thereto with the first sealing pad compressed between the bottom plate and roofing structure; and a top plate mountable onto the bottom plate, the top plate having a projecting connector at a central location and a second compressible sealing pad affixed to an underneath surface of the top plate, said top plate secured to said bottom plate by second fasteners extending through holes in the top plate and into threaded bores in the bottom plate with the second compressible sealing pad contacting the bottom plate and being compressed directly between the top plate and the bottom plate.

2. The roof mount assembly of claim 1, wherein each of the first and second sealing pads has a compressibility within an approximate range of 50% and 90%.

3. The roof mount assembly of claim 1, wherein each of the first and second sealing pads comprises an impregnated foam.

4. A roof mount assembly comprising:
a bottom plate defining a plurality of angularly spaced holes;
a plurality of elongated fasteners, at least one of the elongated fasteners being received in one of said holes to attach the bottom plate to a roofing structure;
a top plate mountable onto the bottom plate, the top plate defining a plurality of top holes; and
a compressible foam sealing pad affixed on an underneath surface of the top plate, wherein
the foam sealing pad has openings aligned with each of the top holes,
the top plate is secured to the bottom plate by plate securement fasteners extending through the top holes and openings in the foam sealing pad and threaded into bores in the bottom plate which thereby compresses the foam sealing pad between the top plate and bottom plate.

5. The roof mount assembly of claim 4, wherein a portion of the compressible foam sealing pad extends over the head of each elongated fastener received in the holes of the bottom plate.

6. The roof mount assembly of claim 4, wherein a portion of the foam sealing pad is affixed to the underneath surface with a portion thereof positioned radially inward of the top holes in the bottom plate.

7. The roof mount assembly of claim 4, comprising a second foam sealing pad affixed to an underside surface of the bottom plate and defining holes aligned with the angularly spaced holes in the bottom plate.

8. A roof mount assembly, comprising:
a bottom plate having a body defining a radially outer section having a plurality of angularly spaced holes extending from a top surface to a bottom surface and a radially inner portion that is open;
one of a plurality of first elongated fasteners extending through each of the holes in the bottom plate and into a roofing structure to secure the bottom plate thereto;
a top plate mountable onto the bottom plate, the top plate having a projecting connector at a central location defining a central axis of the top plate, a radially outer flange around the top plate periphery, and a compressible sealing pad affixed to an underside surface radially inward of the radially outer flange, the radially outer flange being integral with the underside surface; wherein
the top plate is secured to the bottom plate by one or more second fasteners, thereby compressing the sealing pad between the top plate and bottom plate with the radially outer flange flat on a top surface of the roofing structure.

9. The roof mount assembly of claim 8, further comprising an adhesive sealant on the underside surface of the top plate at a position radially outer of the sealing pad.

10. The roof mount assembly of claim 9, wherein the adhesive sealant extends outward of an outer edge of the flange.

11. The roof mount assembly of claim 8, wherein the one or more second fasteners extend through the sealing pad.

12. The roof mount assembly of claim 8, comprising a second compressible sealing pad compressed between the bottom surface of the bottom plate and the top surface of the roofing structure.

13. The roof mount assembly of claim 8, wherein the sealing pad comprises an impregnated foam.

14. The roof mount assembly of claim 12, wherein the second sealing pad is affixed to the bottom surface of the bottom plate.

15. The roof mount assembly of claim 8, wherein the top plate includes an elevated inner section radially inward of the outer flange.

16. A roof mount assembly comprising:
a bottom plate defining a plurality of angularly spaced holes;
a plurality of elongated fasteners, at least one of the elongated fasteners being received in one of said holes to attach the bottom plate to a roofing structure;
a top plate mountable onto the bottom plate, the top plate defining a plurality of top holes; and
a compressible foam sealing pad affixed on an underneath surface of the top plate with a portion of the foam sealing pad extending over the head of each elongated fastener received in the holes of the bottom plate, wherein
the top plate is secured to the bottom plate by plate securement fasteners extending through the top holes and threaded into bores in the bottom plate which thereby compresses the foam sealing pad between the top plate and (i) the bottom plate and (ii) the heads of the elongated fasteners.

17. The roof mount assembly of claim 16, comprising a second compressible sealing pad beneath the bottom surface of the bottom plate, wherein the second sealing pad is compressed between the bottom surface of the bottom plate and a top surface of a top roofing structure via the at least one of the elongated fasteners being driven into the roofing structure.

18. The roof mount assembly of claim 16, wherein the compressible foam sealing pad has openings aligned with each of the top holes.

19. The roof mount assembly of claim 16, wherein the compressible sealing pad is formed from an impregnated foam.

* * * * *